W. A. METZGER.
MILK PAIL COVER.
APPLICATION FILED MAY 7, 1912.
1,045,054.
Patented Nov. 19, 1912.
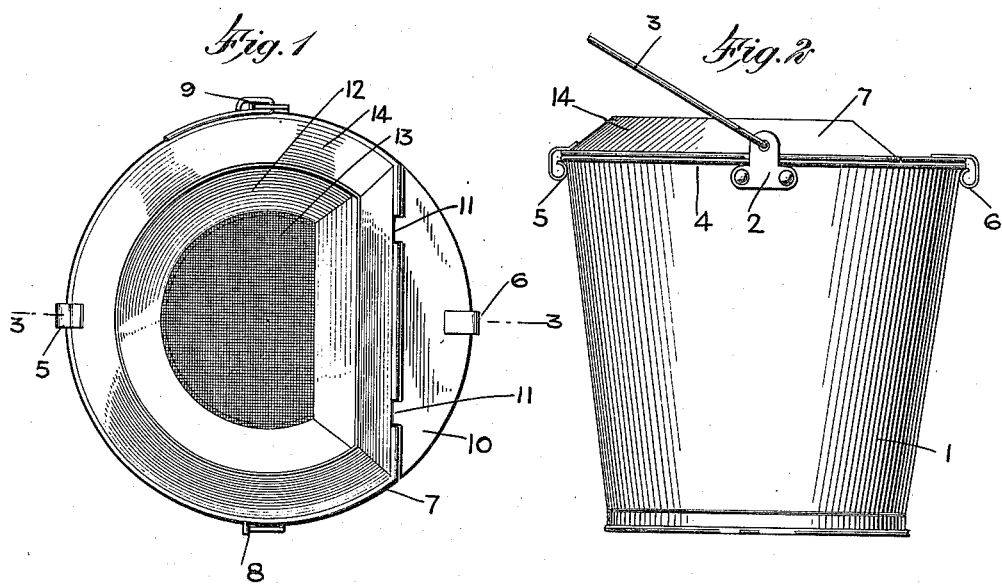
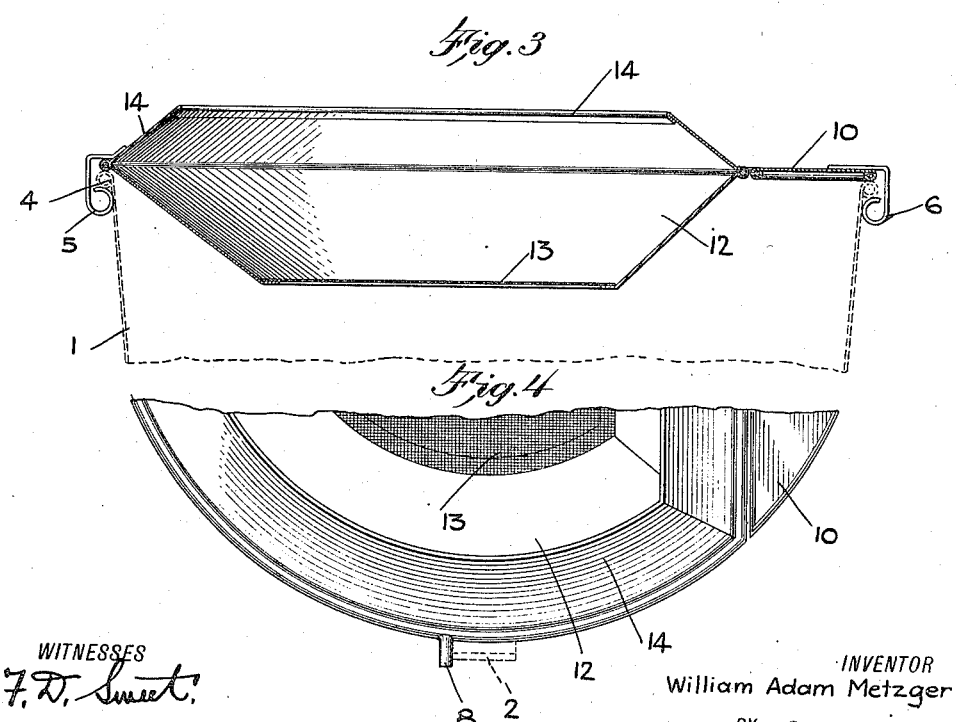
WITNESSES
F. D. Sweet
A. L. Kitchin
INVENTOR
William Adam Metzger
BY
ATTORNEYS

UNITED STATES PATENT OFFICE.

WILLIAM ADAM METZGER, OF RED HOOK, NEW YORK.

MILK-PAIL COVER.

1,045,054.　　　　Specification of Letters Patent.　　Patented Nov. 19, 1912.

Application filed May 7, 1912. Serial No. 695,596.

*To all whom it may concern:*

Be it known that I, WILLIAM ADAM METZGER, a citizen of the United States, and a resident of Red Hook, in the county of Dutchess and State of New York, have invented a new and Improved Milk-Pail Cover, of which the following is a full, clear, and exact description.

This invention relates to covers for milk pails, and has for its object to provide an improved structure designed to thoroughly cover the pail but prevent any foreign or extraneous matter from entering during the milking operation.

Another object of the invention is to provide a milk pail cover designed to be used during the milking operation, which will permit the milk to freely flow into the pail, but which will prevent or minimize the splashing of the milk.

In carrying out the objects of the invention, a cover is provided formed with suitable catches for locking the same properly in position when in use. At one side of the cover is arranged a pivotally mounted door or opening through which the milk is adapted to be poured when emptying the pail, this operation taking place without removing the cover from the pail. The cover proper comprises a frusto-conical shaped receptacle having a screen or straining medium arranged at the bottom through which the milk is designed to pass. At the top an overhanging flange is provided for limiting or preventing splashing.

A practical embodiment of the invention is represented in the accompanying drawings forming a part of this specification, in which similar characters of reference indicate corresponding parts in all the views.

Figure 1 is a top plan view of a cover embodying the invention shown in position; Fig. 2 is a side elevation of the structure shown in Fig. 1; Fig. 3 is a longitudinal vertical view on the line 3—3 of Fig. 1, the same being shown on an enlarged scale; and Fig. 4 is a fragmentary top plan view on an enlarged scale showing one of the retaining lugs.

Referring to the acompanying drawings by numerals, 1 indicates a pail of any desired kind having ears 2 secured thereto for receiving a bail 3. The upper edge of the bucket or pail 1 is provided with a turned over edge or bead 4. This bead is designed to engage catches 5 and 6 secured to the cover 7. In order to properly locate the cover quickly on the pail 1, the same is provided with stops 8 and 9 which are adapted to be pressed against the ears 2 when the cover is being placed in position. This will also cause the catches 5 and 6 to be positioned intermediate the ears and cause the door 10 to be of one size. The door 10 is pivotally mounted at 11 on the cover 7 and is adapted to be open for permitting the contents of the pail to be discharged at any time without removing the cover 7.

The cover 7 is provided with a frusto-conical shaped receptacle 12 having a wire mesh bottom 13 through which the milk is designed to pass when the device is in use. An annular overhanging flange 14 is connected with the upper edge of the receptacle 12, as clearly shown in Fig. 3, which is adapted to prevent splashing over of the milk. By this construction and arrangement an ample opening is provided for the entrance of the milk and means are also provided for catching extraneous matter. It will also be noted that the pail 1 is continually covered at all times during the milking operation and is practically covered during the operation of removing the milk from the pail so that no opportunity is given dirt or other foreign matter to enter the pail. In cleaning the cover the same may be done easily and quickly by forcing a cleansing fluid in a reverse direction through the wire mesh 15, or otherwise as may be desired. The mesh 13 has been described as wire mesh, but it will be, of course, understood that fabric or other desired material could be used at this point.

Having thus described my invention I claim as new and desire to secure by Letters Patent:

1. In a removable milk pail cover, a pair of oppositely positioned frusto-conical shaped members open at their ends, said members being flattened on one side whereby their periphery describes less than a circle, a screen arranged across one of said frusto-conical shaped members, means for connecting said frusto-conical shaped members to a pail, and a door pivotally mounted on said flattened portion formed with a flattened edge co-acting with said flattened portion, and an arc-shaped edge for completing the circle of said frusto-conical shaped members.

2. A removable milk pail cover comprising a frusto-conical shaped member open at the bottom, an overhanging splash member, a wire mesh arranged to cover said bottom, a pivotally mounted door connected to said frusto-conical shaped member at its upper edge, a resilient clamping member connected to said frusto-conical shaped member adapted to fit over the sides of said pail for holding the frusto-conical shaped member in position, and a resilient clamping member connected with said door and adapted to clamp said pail.

In testimony whereof I have signed my name to this specification in the presence of two subscribing witnesses.

WILLIAM ADAM METZGER.

Witnesses:
L. L. SMITH,
JOHN CONROY.